United States Patent [19]

Lee

[11] Patent Number: 5,363,654
[45] Date of Patent: Nov. 15, 1994

[54] RECUPERATIVE IMPINGEMENT COOLING OF JET ENGINE COMPONENTS

[75] Inventor: Ching-Pang Lee, Cincinnati, Ohio

[73] Assignee: General Electric Company, Cincinnati, Ohio

[21] Appl. No.: 58,059

[22] Filed: May 10, 1993

[51] Int. Cl.$^5$ ............................................. F02C 7/12
[52] U.S. Cl. .................................. 60/752; 165/908; 415/115
[58] Field of Search ................ 60/752, 754, 760, 755, 60/757, 753; 165/908; 415/115, 116; 416/95; 431/351

[56] References Cited

U.S. PATENT DOCUMENTS

| | | | |
|---|---|---|---|
| 2,544,538 | 3/1951 | Mahnken et al. | 60/752 |
| 3,584,972 | 6/1971 | Bratkovich | 60/754 |
| 3,605,405 | 9/1971 | Du Bell et al. | 60/39.65 |
| 3,845,620 | 11/1974 | Kenworthy | 60/39.65 |
| 3,990,232 | 11/1976 | Campbell | 60/39.66 |
| 4,056,332 | 11/1977 | Meloni | 415/115 |
| 4,071,194 | 1/1978 | Eckert et al. | 60/755 |
| 4,109,459 | 8/1978 | Ekstedt et al. | 60/39.66 |
| 4,379,677 | 4/1983 | Hallinger et al. | 415/116 |
| 4,573,865 | 3/1986 | Hsia et al. | 415/116 |
| 4,616,976 | 10/1986 | Lings et al. | 415/116 |
| 4,852,355 | 8/1989 | Kenworthy et al. | 60/751 |
| 4,896,510 | 1/1990 | Foltz | 60/757 |
| 4,901,522 | 2/1990 | Commaret et al. | 60/760 |
| 4,909,032 | 3/1990 | Horiuchi et al. | 60/260 |
| 4,916,906 | 4/1990 | Vogt | 60/752 |
| 5,031,693 | 7/1991 | Van Dyke | 165/908 |
| 5,181,379 | 1/1993 | Wakeman et al. | 60/261 |
| 5,216,886 | 6/1993 | Ewing | 431/351 |

FOREIGN PATENT DOCUMENTS

| | | | |
|---|---|---|---|
| 0198685 | 11/1983 | Japan | 165/908 |
| 1060095 | 2/1967 | United Kingdom . | |
| 1356114 | 6/1974 | United Kingdom | 165/908 |
| 2074308A | 10/1981 | United Kingdom . | |
| 1613806 | 12/1990 | U.S.S.R. | 165/908 |

*Primary Examiner*—Richard A. Bertsch
*Assistant Examiner*—Timothy S. Thorpe
*Attorney, Agent, or Firm*—Jerome C. Squillaro; Nathan D. Herkamp

[57] ABSTRACT

Impingement cooling of a jet engine subassembly, such as a combustor. Adjacent raised corrugation portions and intervening plate portions (having impingement cooling holes) of a corrugated plate define coolant channels in fluid communication with the engine compressor. Dividers positioned transverse to the corrugation portions have a top side attached to a bottom surface of the plate portions and have a bottom side attached to the combustor liner. Corrugation portions define therewithin return channels in fluid communication with post-impingement cooling air. The dividers prevent crossflow between the impingement cooling air and the post-impingement cooling air.

10 Claims, 4 Drawing Sheets

RECUPERATIVE IMPINGEMENT COOLING OF JET ENGINE COMPONENTS

BACKGROUND OF THE INVENTION

The present invention relates generally to cooling of jet engine components, and more particularly to impingement cooling of such components. The phrase "jet engine" includes gas turbine, ramjet, and scramjet engines. Such jet engines may be used to power flight vehicles, and the gas turbine engine type of jet engine may also be used to power ships, tanks, electric power generators, pipe line pumping apparatus, etc. For purposes of illustration, the invention will be described with respect to impingement cooling of an aircraft gas turbine engine component using cooling air. However, it is understood that the invention is equally applicable to impingement cooling of other types of jet engines (such as scramjets) and/or to impingement cooling using other cooling fluids (such as liquid fuel, water, steam, and the like).

A gas turbine engine includes a core engine having a high pressure compressor to compress the air flow entering the core engine, a combustor in which a mixture of fuel and the compressed air is burned to generate a hot propulsive gas flow, and a high pressure turbine which is rotated by the propulsive gas flow and which is connected by a shaft to drive the high pressure compressor. Engine thrust comes from the core engine airflow after it flows through the high pressure compressor to the combustor and is expanded past the high pressure turbine and out the exhaust nozzle. A gas turbine engine, such as an aircraft turbofan jet engine, may include other components, such as a thrust producing fan, a low pressure compressor, and a low pressure turbine.

Certain components of gas turbine engines, such as combustor liners, turbine airfoils (i.e., blades and vanes) and shrouds, and exhaust nozzles, are subjected to hot combustion gases. Current engine designs require that such components be cooled to keep their temperatures within design limits. A known technique for cooling gas turbine engine components is impingement cooling of a component wall surface, such as impingement cooling of a back surface of a combustor liner whose front surface is exposed to hot combustion gases. In this technique, a plate is spaced apart from the impingement cooled surface (e.g., the liner) and contains impingement cooling holes through which pressurized impingement cooling air flows in a jet-like fashion, impinging generally perpendicularly against the surface to be cooled (i.e., the impingement cooled surface, such as the liner). The "spent" cooling air (i.e., the post-impingement cooling air) typically flows out of the cooling zone by flowing generally parallel to the plate in the region between the plate and the impingement cooled surface (e.g., the liner). As crossflow from the (generally parallel-flowing) spent cooling air against the (generally perpendicularly-flowing) impingement cooling air weakens the impingement flow and lessens its heat transferring capabilities, techniques are needed to improve the effectiveness of impingement cooling.

SUMMARY OF THE INVENTION

It is an object of the invention to provide for improved impingement cooling of jet engine components (such as combustor liners).

The invention provides a jet engine subassembly (such as a combustor) having a corrugated plate, dividers, and an impingement-cooled surface (such as a combustor liner). The corrugated plate includes corrugation portions and plate portions. The corrugation portions, which are spaced-apart, generally aligned, and raised, are joined together by the intervening and spaced-apart plate portions. The plate portions have impingement cooling holes between their two surfaces (i.e., a first surface on the same side of the corrugated plate as the corrugation portions and a second generally opposing surface). Adjacent corrugation portions and intervening plate portions define coolant channels which are in fluid communication with a pressurized source of supply cooling fluid (such as supply cooling air) during engine operation. The dividers are spaced-apart, generally aligned, and positioned generally transverse to the corrugation portions. The dividers have first and generally opposing second sides. The first side of the dividers generally abuts the second surface of the plate portions, and the impingement-cooled surface generally abuts the second side of the dividers. A corrugation portion (and preferably each such corrugation portion) defines therewithin a return channel in fluid communication with post-impingement cooling fluid during engine operation.

The benefit and advantage derived from the jet engine subassembly of the invention are improved impingement cooling of a jet engine component (i.e., the impingement-cooled surface, such as a combustor liner) because the crossflow of the spent cooling air against the impingement cooling air is blocked by the dividers, with such spent cooling air flowing out of the cooling zone by flowing in the return channels inside the corrugation portions above the dividers. The invention retains the effectiveness of impingement cooling while allowing post-impingement ("spent") cooling air to recuperate from the impingement event (i.e., by not having to suffer from the impacts of crossflow). Hence, such recuperative post-impingement cooling air is available for recirculation to further cool other jet engine components without having its cooling capabilities degraded by such crossflow.

BRIEF DESCRIPTION OF THE DRAWINGS

The accompanying drawings illustrate a preferred embodiment of the present invention wherein.

In the drawings, like reference numerals designate identical or corresponding parts throughout the respective figures. Unnumbered arrows indicate the direction of fluid flow.

DETAILED DESCRIPTION OF THE INVENTION

Figure 1:
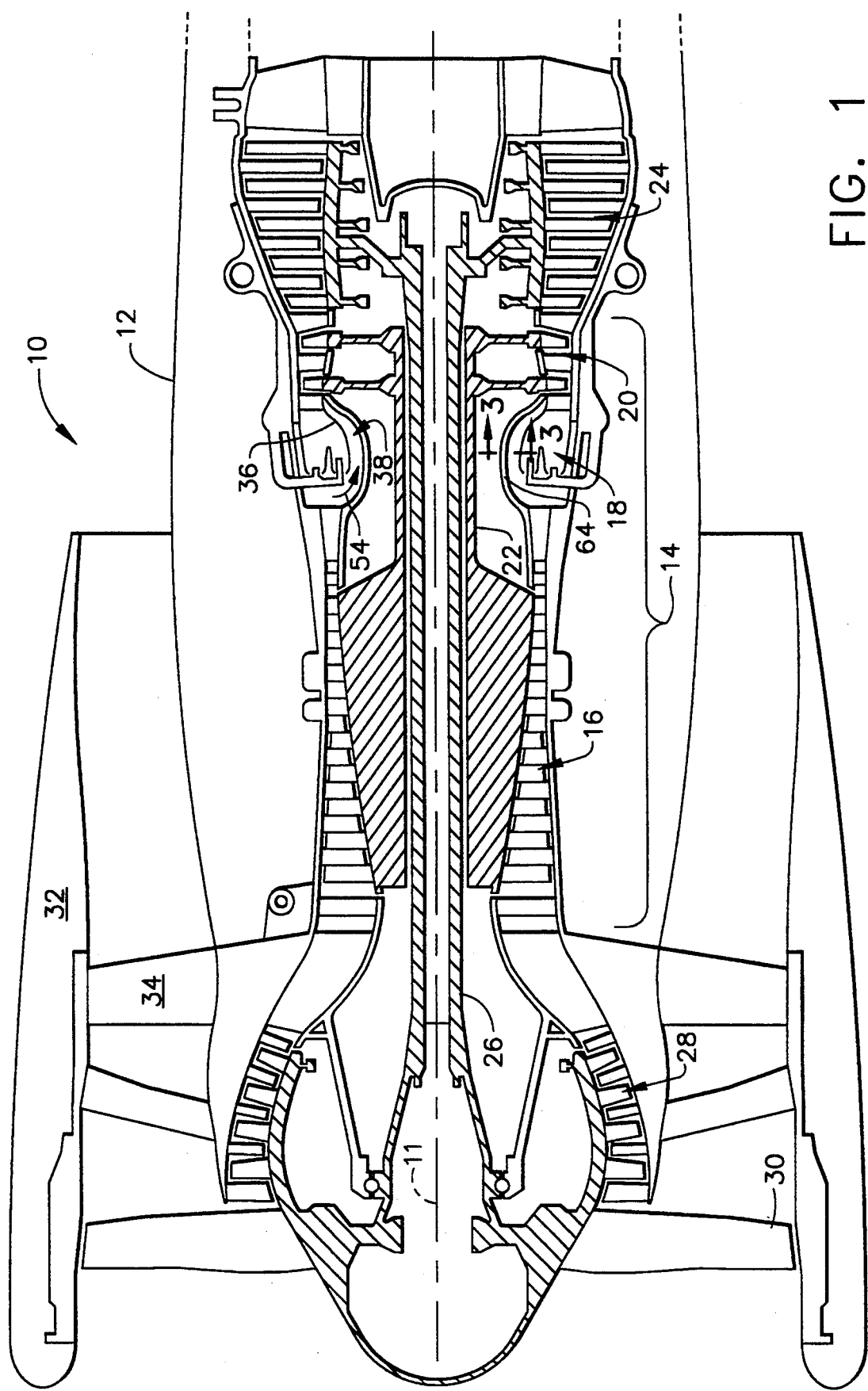
FIG. 1 is a schematic side view of a front fan gas turbine engine (with the exhaust nozzle omitted for clarity) in which the impingement cooling of the invention may be employed.

Referring now to the drawings, and particularly to FIG. 1, there is illustrated generally a jet aircraft front fan gas turbine engine, generally designated 10, which includes a preferred embodiment of the invention as hereinafter described. The turbofan jet engine 10 has a longitudinal centerline or axis 11 and an annular casing 12 disposed coaxially and concentrically about the axis 11. The turbofan jet engine 10 includes a core engine (also called a gas generator) 14 which is comprised of a high pressure compressor 16, a combustor 18, and a high pressure turbine 20, all arranged coaxially about the longitudinal axis 11 of the turbofan engine 10 in a serial, axial flow relationship. An annular drive shaft 22 fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure or power turbine 24. The low pressure turbine 24 turns a drive shaft 26 which drives an interconnected low pressure compressor (also called booster or booster compressor) 28 and fan blades 30. Various engine bearings support the rotating shafts 22 and 26 within the engine casing 12. The fan blades 30 are housed within a fan nacelle 32 which is attached to the engine casing 12 by a plurality of hollow fan struts 34, only two of which are shown in FIG. 1.

Certain components of the gas turbine engine 10 are subjected to hot combustion gases, such as, but not limited to, the inner 36 and outer liners of the combustor 18, the rotor blades and stator vanes of the high and low pressure turbines 20 and 24, and the exhaust nozzle (not shown). The jet engine subassembly 38 of the invention which provides impingement cooling of a jet engine component (also referred to as an impingement-cooled surface) will hereinafter be described, for convenience, with reference to a combustor subassembly 38 which provides cooling of a combustor inner liner 36.

Referring to FIGS. 1–7, the jet engine subassembly 38 of the invention contains a corrugated plate 40 which includes spaced-apart, generally aligned, and raised corrugation portions 42 joined together by intervening and spaced-apart plate portions 44. The corrugation portions 42 are said to be "generally aligned" in that, as you move along the length of a corrugation portion 42, the distance to an adjacent corrugation portion is generally constant. The plate portions 44 have a first surface 46 on the same side of the corrugated plate 40 as the corrugation portions 42, and the plate portions 44 also have a generally opposing second surface 48. The plate portions 44 additionally have impingement cooling holes 50 between the first and second surfaces 46 and 48. It is noted that adjacent corrugation portions 42 and intervening plate portions 44 define coolant channels 52 which are in fluid communication with a pressurized source of supply cooling fluid during engine operation, such supply cooling fluid being supply cooling air 54 and such pressurized source being the high pressure compressor 16. Preferably, the corrugation portions 42 are generally rectangular in shape and are imperforate with respect to cooling air, which means such portions 42 do not have cooling holes.

The subassembly 38 also contains a plurality of spaced-apart and generally aligned dividers 56 disposed generally transverse to the corrugation portions 42 and having first and generally opposing second sides 58 and 60. The first side 58 of the dividers 56 generally abuts the second surface 48 of the plate portions 44.

The subassembly 38 further contains an impingement-cooled surface generally abutting the second side 60 of the dividers 56, such impingement-cooled surface being a surface of the combustor inner liner 36. A corrugation portion 42 (and preferably each such corrugation portion 42) defines therewithin a return channel 62 in fluid communication with post-impingement cooling fluid during engine operation.

In an exemplary embodiment, the first side 58 of the dividers 56 is attached to the second surface 48 of the plate portions 44, and the impingement-cooled surface (i.e., the back surface of the combustor inner liner 36) is attached to the second side 60 of the dividers 56. Preferably, adjacent corrugation portions 42 are enclosed by a cover, such cover being the combustor inner casing 64. The cover (i.e., the combustor inner casing 64) faces, and is generally aligned with, the first surface 46 of the intervening plate portions 44. In a preferred design, the cover (i.e., the combustor inner casing 64) is attached to adjacent corrugation portions 42.

Figure 2:
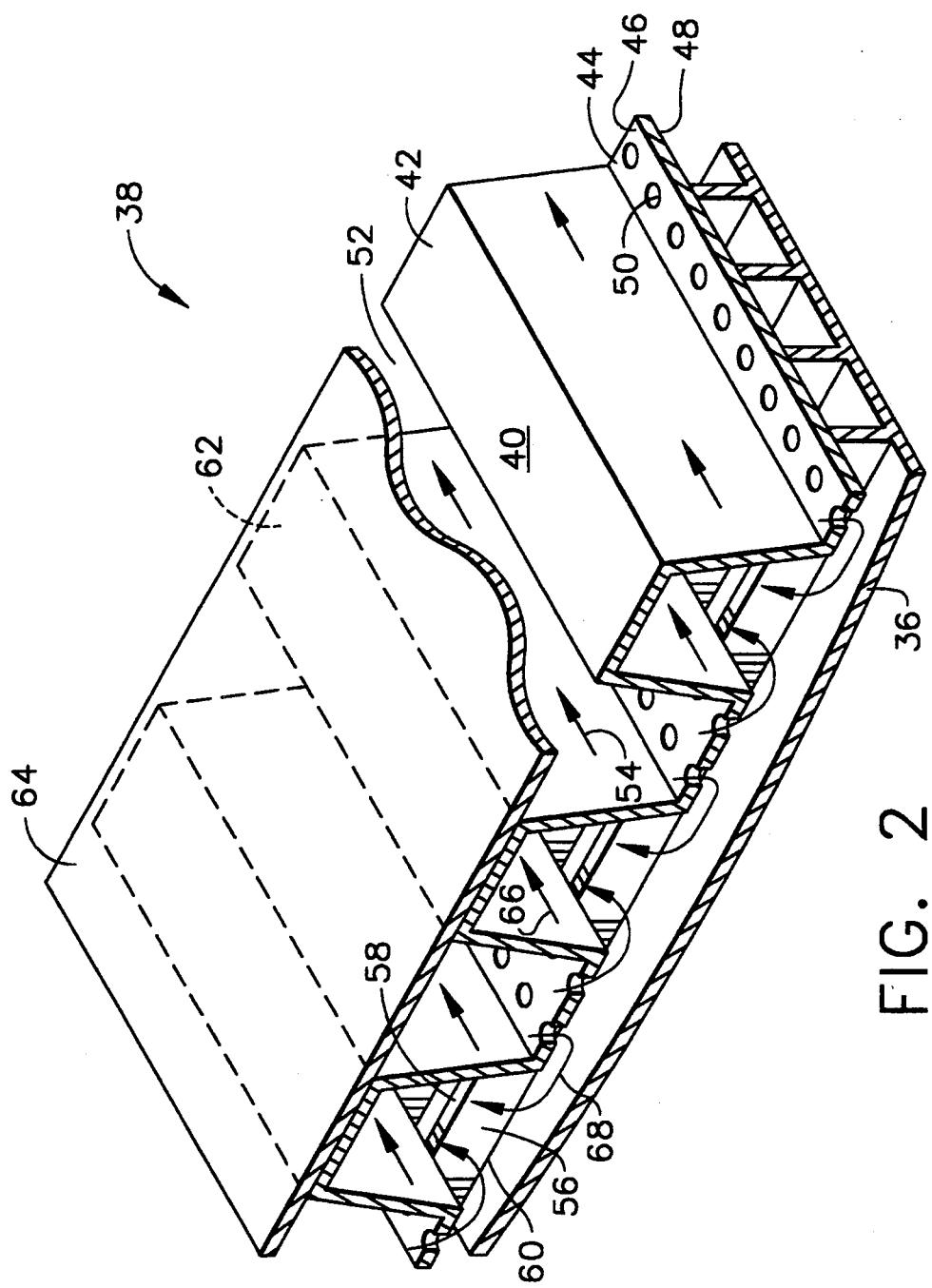
FIG. 2 is a perspective view of a subassembly of the jet engine of FIG. 1, such subassembly including the combustor inner liner (as the jet engine component receiving the impingement cooling of the invention) and also including the combustor inner casing.
Figure 3:
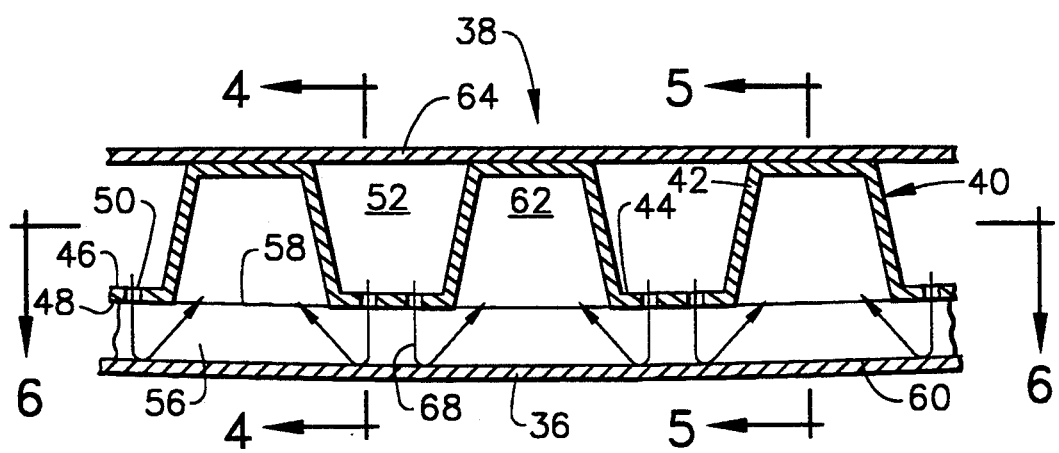
FIG. 3 is a cross sectional view taken along lines 3—3 in FIG. 1.
Figure 4:
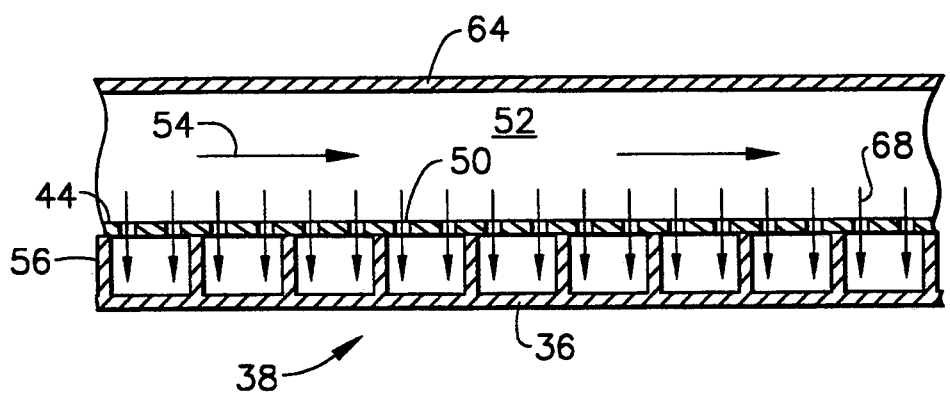
FIG. 4 is a cross sectional view taken along lines 4—4 in FIG. 3.
Figure 5:
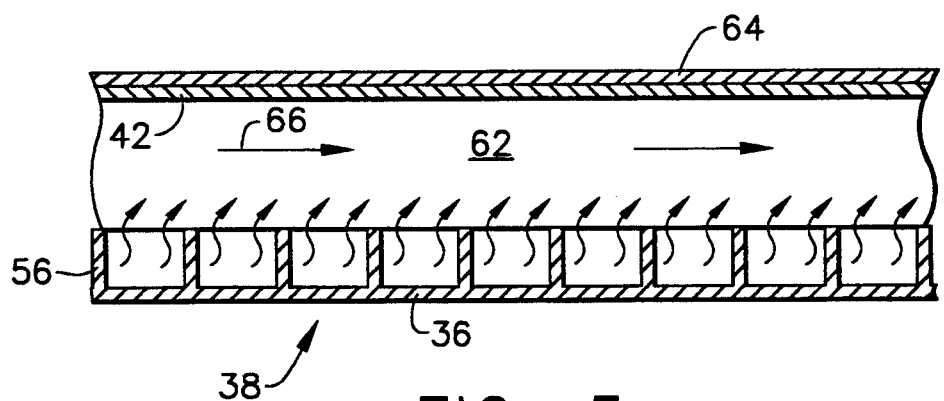
FIG. 5 is a cross sectional view taken along lines 5—5 in FIG. 3.
Figure 6:
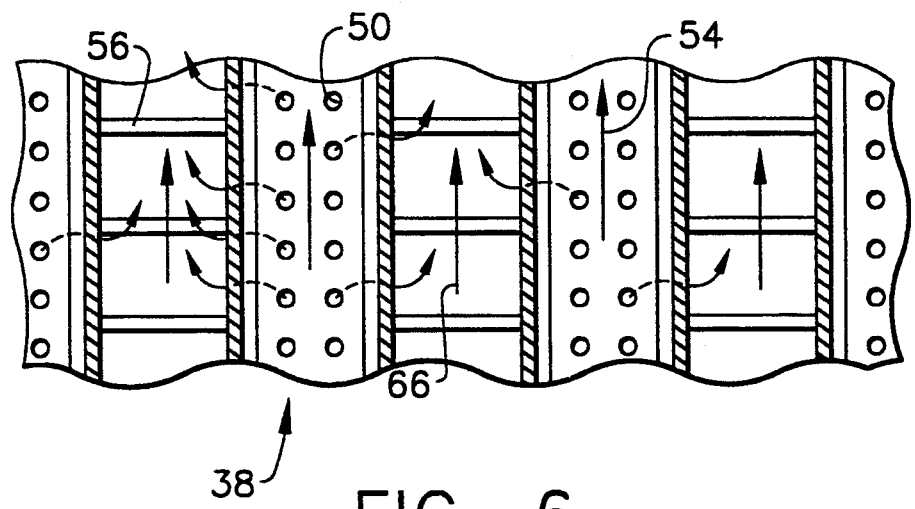
FIG. 6 is a cross sectional view taken along lines 6—6 in FIG. 3.
Figure 7:
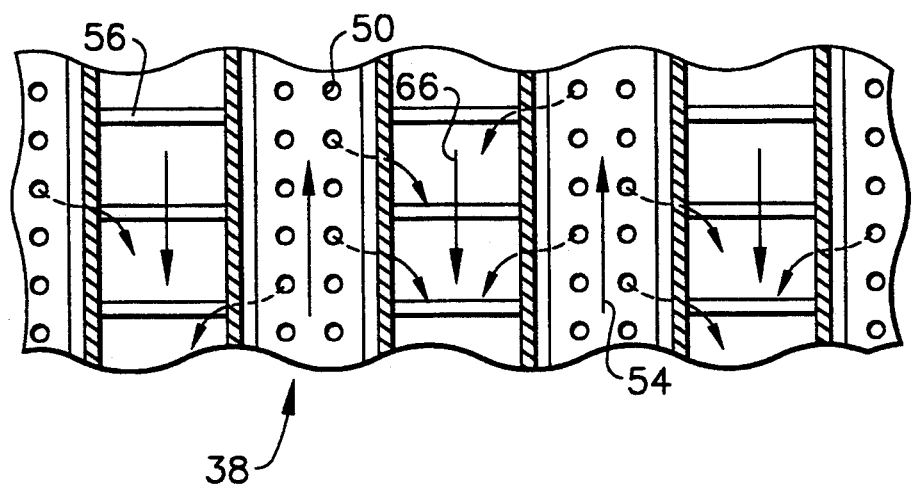
FIG. 7 is an alternate application of the subassembly of FIG. 6 in which the spent cooling air flows in a generally opposite direction to that of the supply cooling air.

As best seen in FIG. 2, the supply cooling fluid (i.e., the supply cooling air 54) flows in a first direction (indicated by the arrowhead) in the coolant channels 52. In the application of the subassembly 38 of the invention shown in FIG. 6, post-impingement cooling fluid (i.e., post-impingement or "spent" cooling air 66) in the return channels 62 flows in generally the same direction as the first direction of the supply cooling fluid (i.e., supply cooling air 54). However, in the alternate application shown in FIG. 7, post-impingement cooling air 66 in the return channels 62 flows in generally the opposite direction from the first direction of the supply cooling air 54.

Preferred assembly techniques include the dividers 56 being cast with the combustor inner liner 36 as a single piece or being brazed on the liner 36. The corrugation portions 42 can be generally triangular in shape instead of being generally rectangular. Other shapes are possible depending on detail design requirements. The plate portions 44 can be attached to the dividers 56 through mechanical attachment, brazing, and the like.

During engine operation, a portion of discharge air from the high pressure compressor 16 bypasses the combustion chamber of the combustor 18 to become supply cooling air 54 which flows in the coolant channels 52. Such supply cooling air 54 then flows through the impingement cooling holes 50 to become impingement cooling air 68. After striking the impingement cooled surface (i.e., the back surface of the combustor inner liner 36) in a jet-like fashion, the impingement cooling air 68 becomes post-impingement cooling air 66 which flows out of the cooling zone in the return channels 62. The dividers 56 serve as crossflow deflectors and also control the impingement distance. The invention retains the effectiveness of impingement cooling while allowing post-impingement cooling air to recuperate from the impingement event (i.e., by not having to suffer from the impacts of crossflow). Hence, such recuperative post-impingement cooling air is available for recirculation to further cool other jet engine components (not shown) without having its cooling capabilities degraded by such crossflow.

It is noted that the subassembly 38 shown (in portion) in FIG. 2 is that of a curved combustor. The invention is equally applicable to subassemblies of other shapes. When the jet engine component requiring impingement cooling (i.e., the impingement cooled surface) is generally planar, it is understood that the term "generally aligned with" previously used to describe the curved combustor should also be taken to mean "generally parallel to".

The foregoing description of a preferred embodiment of the invention has been presented for purposes of illustration. It is not intended to be exhaustive or to limit the invention to the precise form disclosed, and obviously many modifications and variations are possible in light of the above teachings, all of which are within the scope of the claims appended hereto.

I claim:
1. A jet engine subassembly comprising:
   (a) a corrugated plate including spaced-apart, generally aligned, and raised corrugation portions joined together by intervening and spaced-apart plate portions having a first surface on the same side of said corrugated plate as said corrugation portions, a generally opposing second surface, and impingement cooling holes between said first and second surfaces, with adjacent said corrugation portions and intervening said plate portions defining coolant channels in fluid communication with a pressurized source of supply cooling fluid during engine operation;
   (b) a plurality of spaced-apart and generally aligned dividers disposed generally transverse to said corrugation portions and having first and generally opposing second sides, said first side of said dividers generally abutting said second surface of said plate portions; and
   (c) an impingement-cooled surface generally abutting said second side of said dividers, and wherein a said corrugation portion defines therewithin a return channel in fluid communication with post-impingement cooling fluid during engine operation.

2. The jet engine subassembly of claim 1, wherein said first side of said dividers is attached to said second surface of said plate portions.

3. The jet engine subassembly of claim 2, wherein said impingement-cooled surface is attached to said second side of said dividers.

4. The jet engine subassembly of claim 3, wherein adjacent said corrugation portions are enclosed by a cover which faces, and is generally aligned with; said first surface of said intervening plate portions.

5. The jet engine subassembly of claim 4, wherein said cover is attached to said adjacent corrugation portions and wherein said supply cooling fluid flows in a first direction in said coolant channels.

6. The jet engine subassembly of claim 5, wherein each said corrugation portion defines therewithin a return channel in fluid communication with post-impingement cooling fluid during engine operation and wherein said post-impingement cooling fluid in said return channel flows in generally the same direction as said first direction.

7. The jet engine subassembly of claim 5, wherein each said corrugation portion defines therewithin a return channel in fluid communication with post-impingement cooling fluid during engine operation and wherein said post-impingement cooling fluid in said return channel flows in generally the opposite direction from said first direction.

8. The jet engine subassembly of claim 1, wherein said impingement cooled surface is a combustor liner surface.

9. The jet engine subassembly of claim 1, wherein said corrugation portions have a generally rectangular shape.

10. The jet engine subassembly of claim 1, wherein said supply cooling fluid is supply cooling air.

* * * * *